United States Patent
Zhang et al.

(10) Patent No.: US 12,215,426 B2
(45) Date of Patent: Feb. 4, 2025

(54) COMPOSITE COATING FOR ELIMINATING POLLUTION BY HEAVY METAL CHROMIUM AND VOCS FROM SOURCE AND PREPARATION METHOD

(71) Applicant: GUANGDONG PROVINCIAL ACADEMY OF BUILDING RESEARCH GROUP CO., LTD, Guangdong (CN)

(72) Inventors: Kai Zhang, Guangdong (CN); Shichao Yang, Guangdong (CN); Yang Ma, Guangdong (CN)

(73) Assignee: GUANGDONG PROVINCIAL ACADEMY OF BUILDING RESEARCH GROUP CO., LTD, Guangdong (CN)

( * ) Notice: Subject to any disclaimer, the term of this patent is extended or adjusted under 35 U.S.C. 154(b) by 401 days.

(21) Appl. No.: 17/775,592

(22) PCT Filed: Feb. 24, 2020

(86) PCT No.: PCT/CN2020/076436
§ 371 (c)(1),
(2) Date: May 10, 2022

(87) PCT Pub. No.: WO2021/147135
PCT Pub. Date: Jul. 29, 2021

(65) Prior Publication Data
US 2022/0403525 A1    Dec. 22, 2022

(30) Foreign Application Priority Data

Jan. 23, 2020 (CN) .......................... 202010076541.8

(51) Int. Cl.
| | | |
|---|---|---|
| C23C 22/34 | (2006.01) |
| B05D 1/06 | (2006.01) |
| B05D 3/02 | (2006.01) |
| B05D 3/10 | (2006.01) |
| B05D 7/14 | (2006.01) |
| C09D 5/03 | (2006.01) |
| C09D 5/08 | (2006.01) |
| C09D 127/12 | (2006.01) |
| C23C 22/78 | (2006.01) |

(52) U.S. Cl.
CPC ............... *C23C 22/34* (2013.01); *B05D 1/06* (2013.01); *B05D 3/0254* (2013.01); *B05D 3/102* (2013.01); *B05D 7/14* (2013.01); *C09D 5/03* (2013.01); *C09D 5/08* (2013.01); *C09D 127/12* (2013.01); *C23C 22/78* (2013.01)

(58) Field of Classification Search
None
See application file for complete search history.

(56) References Cited

U.S. PATENT DOCUMENTS

| | | | |
|---|---|---|---|
| 4,999,221 A * | 3/1991 | Eigenbrod | ............. B05D 5/086 |
| | | | 427/407.1 |
| 5,298,092 A | 3/1994 | Schriever | |
| 2003/0221751 A1 | 12/2003 | Claffey et al. | |

FOREIGN PATENT DOCUMENTS

| | | | |
|---|---|---|---|
| CA | 1098253 | 3/1981 | |
| CN | 102242358 | 11/2011 | |
| CN | 102367345 | 3/2012 | |
| CN | 102409332 | 4/2012 | |
| CN | 103184446 | 7/2013 | |
| CN | 105132900 | 12/2015 | |
| CN | 106086846 | 11/2016 | |
| CN | 106833165 | 6/2017 | |
| CN | 107502081 | 12/2017 | |
| CN | 106543816 | 6/2019 | |
| CN | 106086857 | 7/2019 | |
| JP | H05-115843 A * | 5/1997 | ............... B05D 7/24 |
| JP | 2009052088 A * | 3/2009 | ............... B05D 7/14 |
| JP | 4373778 | 11/2009 | |

OTHER PUBLICATIONS

Machine translation of CN 102242358 A (Year: 2011).*
Machine translation of JP 2009-052088 A (Year: 2009).*
Machine translation of JP H05-115843 A (Year: 1993).*
"International Search Report (Form PCT/ISA/210) of PCT/CN2020/076436," mailed on Oct. 21, 2020, with English translation thereof, pp. 1-4.

* cited by examiner

*Primary Examiner* — Ramsey Zacharia
(74) *Attorney, Agent, or Firm* — JCIP GLOBAL INC.

(57) ABSTRACT

Disclosed is a composite coating for eliminating pollution by chromium and VOCs from a source, the coating comprising a conversion film layer and a coating surface layer. The conversion film layer is made of a surface pretreatment liquid, and the surface pretreatment liquid comprises the following components: an organic compound A having an aromatic ring and at least two phenolic hydroxyl groups in the molecule thereof, or a hydrate thereof; an ionic compound B containing zirconium and/or titanium and fluorine; a mixed solution C containing manganese fluoride; and an inorganic salt D containing potassium ions or sodium ions. The coating surface layer is an FEVE-type fluorocarbon powder coating layer. Also disclosed is a preparation method for the described composite coating.

19 Claims, 6 Drawing Sheets

COMPOSITE COATING FOR ELIMINATING POLLUTION BY HEAVY METAL CHROMIUM AND VOCS FROM SOURCE AND PREPARATION METHOD

CROSS-REFERENCE TO RELATED APPLICATION

This application is a 371 of international application of PCT application serial no. PCT/CN2020/076436, filed on Feb. 24, 2020, which claims the priority benefit of China application no. 202010076541.8, filed on Jan. 23, 2020. The entirety of each of the above mentioned patent applications is hereby incorporated by reference herein and made a part of this specification.

TECHNICAL FIELD

The disclosure belongs to the scientific and technical field of heavy metal and air pollution control, and particularly, relates to a composite coating for eliminating pollution by heavy metal chromium and VOCs from a source and a preparation method.

DESCRIPTION OF RELATED ART

Heavy metal chromium, especially hexavalent chromium, is a highly toxic pollutant. The National Toxicology Program Division found through experiments that drinking water containing hexavalent chromium can cause cancer in laboratory mice. Another study also showed that: ① workers exposed to hexavalent chromium for a long time are more likely to develop gastric cancer; ② exposure to hexavalent chromium during the critical period of fetal and infant development, even a small amount, will cause more serious harm than adults exposed to large amounts of hexavalent chromium; and ③ inhalation of hexavalent chromium in the air can lead to lung cancer. Due to the great harm of hexavalent chromium, the world has paid great attention to the control of chromium pollution.

At present, the treatment methods of heavy metal pollution in various countries in the world generally include four measures: chemical treatment, engineering treatment, biological treatment, and agricultural treatment. However, these methods all belong to the model of "pollution first, treatment later". The lessons of history tell people, however, that this model requires high costs, and many of the consequences of pollution cannot be completely eliminated.

The pollution sources of hexavalent chromium mainly come from the fields of metal processing and electroplating in industrial production, and also include the waste residue produced in various other industrial productions. Aluminum, for example, is one of the most produced metal materials in the world. However, in the production process of aluminum and aluminum alloy products, in order to improve wear resistance and corrosion resistance, it is necessary to carry out surface treatment on the metal. The conventional treatment method is to coat a layer of chromate conversion film as an intermediate layer on the surface of aluminum and aluminum alloys, which is called pretreatment. Next, paint is sprayed on the surface of the formed chromate conversion film.

The chromate conversion coating is a passive chromium-containing protective film formed on the workpieces subjected to chromate conversion treatment. After film formation, the wear resistance, heat resistance, electrical resistance, and surface coating adhesion of aluminum and aluminum alloy surfaces may be effectively improved.

However, the chromate pretreatment process on the aluminum metal surface is accompanied by the generation of heavy metal wastewater containing hexavalent chromium. 100 million tons of chromium-containing wastewater is discharged from the production process of aluminum and aluminum alloys each year, causing pollution to the environment.

In order to solve the pollution problem caused by the chromate conversion film pretreatment technology, the "chromate-free" pretreatment technology comes into being.

In Canadian patent application CA1098253A, a transparent chromium-free pretreatment film is prepared using zirconium or titanium or a mixture thereof with phosphate or available fluoride. However, the stability of this pretreated film is insufficient, and it turned black after being immersed in boiling water for 2 minutes. In Chinese patent CN106086857B, a synergistically optimized chromium-free conversion film is prepared on the surface of aluminum-based metals by using potassium molybdate and/or sodium molybdate with tannic acid, fluorotitanic acid, boron oxyacid or silicon oxyacid, disodium oxalate tetraacetate, and surfactants. In US patent application U.S. Pat. No. 5,298,092A, a chromium-free oxide coating for aluminum substrates is disclosed. A soluble cobalt-III hexacoordinate complex is used to prepare a cobalt conversion coating to replace the chromate coating on a metal substrate under alkaline conditions. The metal substrate can be aluminum or aluminum alloy, as well as Cd coating, Zn coating, Zn—Ni coating, steel and the like. Japanese patent JP4373778B2 is selected from the combination of at least one titanium and zirconium compound derived from HF, silicon element, and at least one of $HClO_3$, $HBrO_3$, $HNO_3$, $HNO_2$, $HMnO_4$, $HVO_3$, $H_2O_2$, $H_2WO_4$, and $H_2MoO_4$. The metal surface is first etched and then a layer of oxide and/or hydroxide of at least one metal element is formed.

The emergence of the chromium-free pretreatment film (YS/T 1189-2017) on the surface of aluminum and aluminum alloys solves the problem of chromate contamination in the surface pretreatment of aluminum processing.

Besides hexavalent chromium, another pollution of concern is closely related to volatile organic compounds (VOCs).

VOCs are key pollutants in the prevention and control of air pollution in China, and the production and use of coatings are the main source of VOCs emissions. The United States and the European Union formulated VOC emission standards for the coatings industry in the 1990s, while China has only begun to control VOC emissions since 2010. At present, China's control of VOCs is insufficient. According to statistics, regarding industrial coatings, the utilization rate of coatings with low VOC emission such as water-based and powder is less than 20% in China, which is far lower than the level of 40% to 60% in developed countries in Europe and America.

Studies have shown that the use of high-solid coatings or water-based coatings can reduce VOCs by 50% to 80% compared to conventional solvent-based coatings. The powder coating does not generate VOCs at all. Therefore, strengthening source control and accelerating the use of powder, water-based, high solid content, radiation curing, and other low VOC emission coatings to replace the conventional solvent-based coatings is an important way to control VOC pollution.

Taking the production of aluminum and aluminum alloys as an example, in order to improve the decoration and anti-corrosion and weather resistance properties of aluminum products, it is necessary to use coatings for coating. However, during the coating process, more than 50% of the solvent of solvent-based coatings will volatilize, resulting in VOC pollution.

At present, researchers have developed organic solvent-free powder fluorocarbon coatings, which are generally divided into polyvinylidene chloride type (PVDF type) and fluoroolefin-vinyl ether copolymer type (FEVE type). Chinese patent application CN102367345A uses an ultra-fine PVDF resin, thermoplastic acrylic acid and their modified products as the main base materials to prepare PVDF ultra-fine fluorocarbon powder coating. Chinese patent CN106543816B discloses a preparation method of fluorocarbon powder based on PVDF resin, and prepares solvent-free PVDF fluorocarbon powder. In Chinese patent application CN106833165A, a super-weather-resistant pure fluorocarbon powder coating on aluminum surface is prepared with FEVE fluorocarbon resin as the base material. By combining with the conventional chromate conversion coating, the weather resistance of the coating can be improved, and the problems of poor adhesion and impact resistance of fluorocarbon powder coatings can be overcome. Chinese patent application CN107502081A discloses a high-performance FEVE fluorocarbon powder coating and a preparation method thereof. Through electrostatic spraying on the surface of conventional chromate conversion coating, good weather resistance is guaranteed, and the defects of high thickness requirement and poor leveling performance of fluorocarbon powder have been overcome.

The pollution problem caused by VOCs can be solved from the source through powder fluorocarbon coatings. However, the powder-type fluorocarbon coatings are not compatible with the current "chromium-free" pretreatment technology, which is manifested in poor adhesion, and the combined impact resistance, bending resistance, and acetic acid salt spray performance cannot meet the relevant standards. Therefore, in the production process of aluminum and aluminum alloys in the related art, only compromise methods may be adopted, and the methods include the followings.

① A conventional chromate conversion coating is selected for pretreatment, and the powder type fluorocarbon coating shows good compatibility with the chromate conversion coating. However, this method may lead to the pollution problem of generation of chromium-containing wastewater.

② A layer of acrylic resin is applied as a "primer" on the surface of the film formed by "chromium-free" pretreatment, and then a powder type fluorocarbon paint is sprayed. However, this method not only complicates the coating process, but also greatly reduces the performance of fluorocarbon coatings.

③ Conventional solvent-based fluorocarbon coatings are used, but this method is accompanied by the pollution problem of VOCs.

In the above compromise methods, the performance of the coating needs to be sacrificed, so that the performance of the aluminum and aluminum alloy materials cannot meet the application requirements, or chromium wastewater and/or VOCs that pollute the environment are generated, so that the ideal effect of eliminating chromium-containing wastewater from the source and eliminating VOCs from the source at the same time cannot be achieved.

Therefore, under the current situation, development of a composite coating that can not only satisfy the chromium-free pretreatment film on the surface of aluminum and aluminum alloy as the bottom layer, but also replace the solvent-based fluorocarbon coating with powder-based fluorocarbon coating to eliminate heavy metal chromium and VOCs pollution from the source is an important issue.

SUMMARY

The first objective the disclosure is to provide a composite coating for eliminating pollution by heavy metal chromium and VOCs from a source, and the composite coating has good impact resistance, weather resistance, and chemical reagent resistance, eliminates the problem of pollution by both heavy metal chromium and VOCs from the source, and is green and environmentally friendly.

The second objective of the disclosure is to provide a preparation method of the composite coating.

The first objective of the disclosure is implemented through the following technical solutions.

A composite coating for eliminating pollution by heavy metal chromium and VOCs from a source and including a conversion film layer and a coating surface layer is provided.

The conversion film layer is made from a surface pretreatment liquid, and the surface pretreatment liquid comprises the following components:

an organic compound A having an aromatic ring and at least two phenolic hydroxyl groups in the molecule thereof, or a hydrate thereof;

an ionic compound B containing zirconium and/or titanium and fluorine;

a mixed solution C containing manganese fluoride; and an inorganic salt D containing potassium ions or sodium ions.

The coating surface layer is an FEVE-type fluorocarbon powder coating layer.

It is proved by experiments that the conversion film layer prepared by using the surface pretreatment liquid shows good compatibility with the FEVE type fluorocarbon powder coating, which is specifically manifested in that the FEVE type fluorocarbon powder coating exhibits good adhesion on the surface of the conversion film layer. Further, the composite coating exhibits good weather resistance, impact resistance, chemical resistance, and aging resistance. In this way, compatibility between chrome-free pretreatment technology and powder-based fluorocarbon coating is achieved without sacrificing coating performance. In the process of metal production, the production of heavy metal chromium and VOCs is simultaneously eliminated from the source, thereby realizing the green environmental protection of the metal production process.

Preferably, the molar concentration of each component of the surface pretreatment liquid is:

0.2 mmol/L to 1.0 mmol/L of the organic compound A having an aromatic ring and at least two phenolic hydroxyl groups in the molecule thereof, or the hydrate thereof;

0.1 mmol/L to 0.5 mmol/L of the ionic compound B containing zirconium and/or titanium and fluorine;

0.15 mmol/L to 0.5 mmol/L of the mixed solution C containing manganese fluoride; and 0.1 mmol/L to 0.5 mmol/L of the inorganic salt D containing potassium ions or sodium ions.

The concentration of the mixed solution C is calculated based on the concentration of manganese ions therein.

The composite coating is suitable for common metals and alloys, such as aluminum, magnesium, copper, iron, zinc, and their alloys, among which, the effect is particularly good when applied to aluminum and aluminum alloys.

Taking the organic compound A having at least two phenolic hydroxyl groups in the molecule and the aromatic ring as the benzene ring as an example, the molecular structure is:

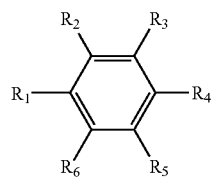

where $R_2$, $R_3$, $R_4$, $R_5$, and $R_6$ are selected from H (hydrogen) or OH (hydroxyl), and at least two of $R_2$, $R_3$, $R_4$, $R_5$, and $R_6$ are OH. For instance, $R_2$ and $R_3$ are hydroxyl groups, $R_3$ and $R_4$ are hydroxyl groups, and $R_2$ and $R_4$ are hydroxyl groups, $R_2$ and $R_5$ are hydroxyl groups, $R_2$ and $R_6$ are hydroxyl groups, $R_3$ and $R_5$ are hydroxyl groups, $R_3$ and $R_6$ are hydroxyl groups, $R_2$, $R_3$, and $R_4$ are hydroxyl groups, $R_2$, $R_3$, and $R_5$ are hydroxyl groups, $R_2$, $R_3$, and $R_6$ are hydroxyl groups, $R_3$, $R_4$, and $R_5$ are hydroxyl groups, $R_2$, $R_4$, and $R_5$ are hydroxyl groups, etc.

$R_1$ can be selected from other substituents such as an amide group

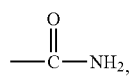

a carboxyl group

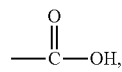

and an aldehyde group

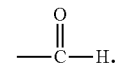

Experiments show that the type of $R_1$ group has little effect on the reaction.

In addition to the benzene ring, the aromatic ring of the organic compound A can also be other condensed ring compounds, which do not affect the implementation of the objective of the disclosure, and similar technical effects may also be achieved.

Preferably, the organic compound A is selected from one or more of 3,4,5-trihydroxybenzamide, 3,4,5-trihydroxybenzoic acid, 3,4,5-trihydroxybenzaldehyde, and 2,4,6-trihydroxybenzoic acid. More preferably, the organic compound A is 3,4,5-trihydroxybenzoic acid.

The ionic compound B is selected from fluozirconic acid and/or fluozirconate, including one or more of potassium fluozirconate, sodium fluozirconate, and ammonium fluozirconate, or is selected from fluotitanic acid and/or fluotitanate, including one or more of sodium fluorotitanate and ammonium fluorotitanate.

In a preferred embodiment of the disclosure, the mixed solution C is prepared by dissolving manganese fluoride dihydrate in dilute sulfuric acid. Experiments show that the fluoride ion in manganese fluoride dihydrate can further promote the reaction.

According to the experimental results, the mechanism of action of the disclosure is deduced as follows:

Taking the metal as aluminum, the organic compound A as 3,4,5-trihydroxybenzoic acid, and the ionic compound B as potassium fluorozirconate as an example, when the surface pretreatment liquid is in contact with the surface of aluminum or aluminum alloy, the ionic compound B is adsorbed on the metal surface to form a structure a1. In the absence of the mixed solution C, since the organic compound A contains multiple phenolic hydroxyl groups, it is easy for the organic compound A to interact with the structure a1 to form hydrogen bonds, hydrophobicity, and π-π stacking, so that the organic compound A exhibits strong adhesion on the metal surface. Under a weak acidic condition, the hydrogen atom in the phenolic hydroxyl group of the organic compound A undergoes electrophilic attack with the oxygen atom in Zr—O$^+$(H)—Zr in the metal oxide (see structure a1), the O—H bond of the phenolic hydroxyl group is broken to form ph-O$^-$ and Zr—O$^{2+}$(H$_2$)—Zr, Zr—O$^{2+}$(H$_2$)—Zr then removes H$_2$O, and the two Zr combine with ph-O$^-$ to form the final chelated product a2. The above reaction has two transition state reaction energy barriers, which are 25.41 kcal/mol and 72.4 kcal/mol.

The reaction process is as follows:

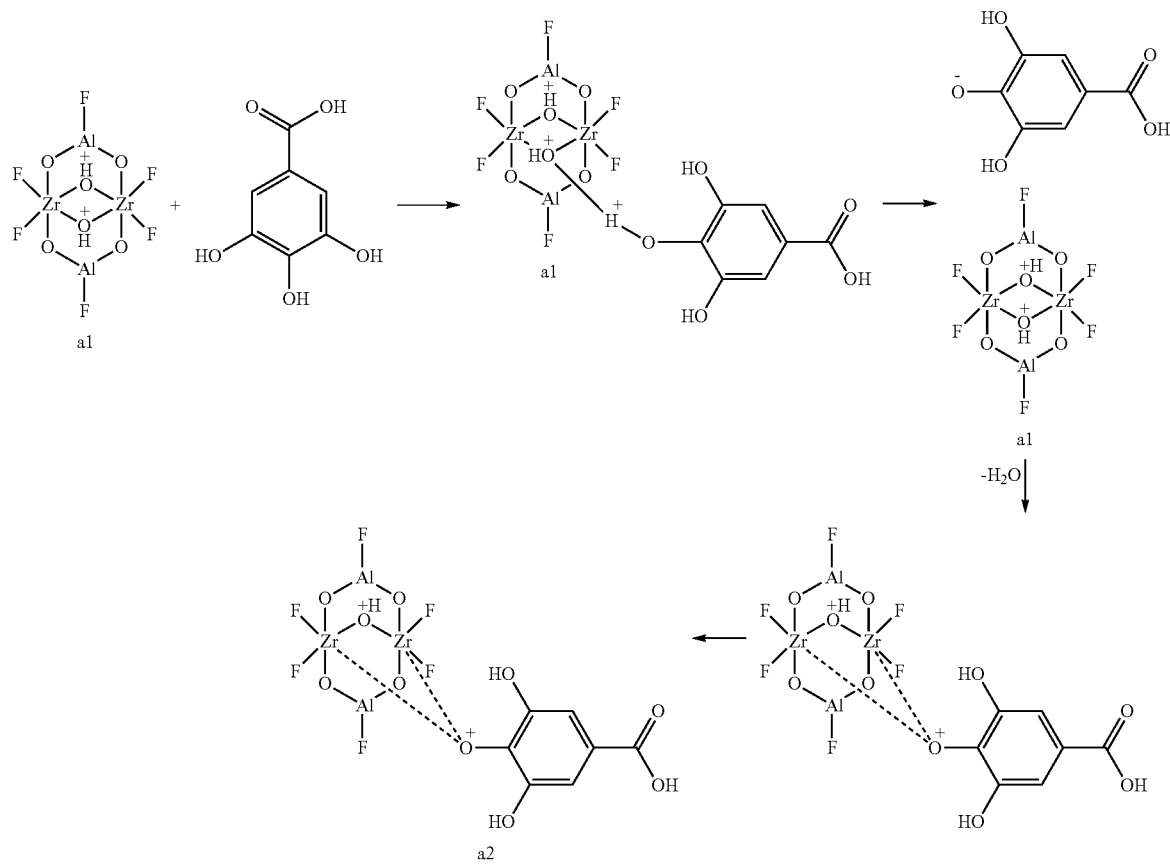

When the mixed solution C exists, $Mn^{2+}$ oxidizes to form Mn=O. When the fluoride ions in the manganese fluoride gather on the metal surface, the oxygen atoms can abstract the hydrogen atoms of Zr—$O^+$(H)—Zr in the a1 structure, so that the O—H bond and the Mn=O bond are broken. The oxygen atoms in Zr—O—Zr bond with Mn atoms with empty orbitals to form the final chelated product a3. After stoichiometric calculations, in the presence of the mixed solution C, the number of steps in the reaction is reduced, and the reaction process has only one transition state. Further, the reaction energy barrier is 45.3 kcal·mol, which is significantly lower than that of the mixed solution C. Finally, a uniform and yellow conversion film layer is formed on the metal surface. In addition, experiments have proved that it is difficult to achieve the abovementioned effect by using other manganese salts other than manganese fluoride, so it is inferred that the $F^-$ ions in manganese fluoride play a role in promoting this reaction.

The reaction process is as follows:

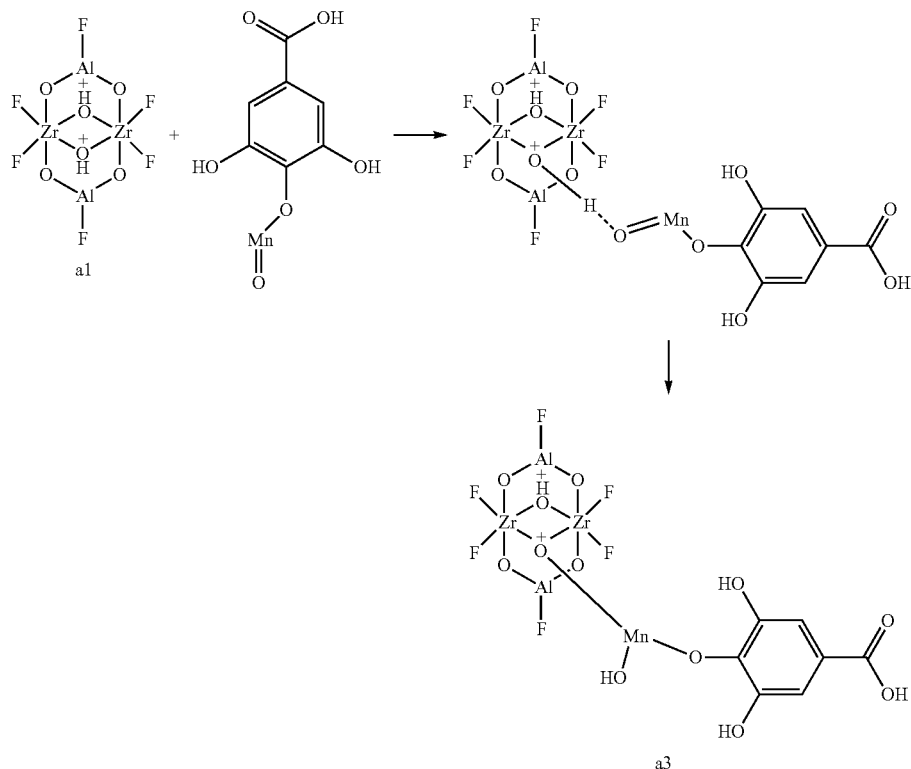

On the other hand, it has been found through experiments that when the organic compound A contains only one phenolic hydroxyl group, it is difficult for the surface pretreatment liquid to form a conversion film layer on the metal surface. It is inferred that the reason for this phenomenon is that when the organic compound A contains only one phenolic hydroxyl group, the unit concentration of the phenolic hydroxyl group in the surface pretreatment liquid is insufficient, so that the above reaction cannot proceed in the positive direction. Only when the organic compound A contains two or more phenolic hydroxyl groups, the conversion film layer can be formed smoothly.

It is found through experiments that the conversion film layer exhibits a honeycomb skeleton structure. This honeycomb skeleton structure provides a good attachment point for the fluorocarbon powder coating, and has a positive impact on the compatibility of the conversion film layer with the fluorocarbon powder coating.

The inorganic salt D in the disclosure may be various inorganic salts containing potassium ions or sodium ions. The type of the anion has no obvious effect on the formation and performance of the conversion film layer as well as the performance of the final composite coating. The inorganic salt D may be one or more of sodium sulfate, potassium sulfate, sodium fluoride, potassium fluoride, sodium hexafluoroaluminate, potassium hexafluorochlorate, etc.

The surface pretreatment liquid may further include a fast penetrating agent E to speed up the film-forming speed of the conversion film layer, and its concentration is preferably $2 \times 10^{-6}$ to $6 \times 10^{-6}$ mmol/L. The fast penetrating agent E may be selected from diisooctyl maleate sulfonate.

Preferably, a fluorocarbon type powder coating with a FEVE resin content of 40% to 100% and with no organic solvent is selected for the FEVE type fluorocarbon powder coating. More preferably, a fluorocarbon type powder coating with a FEVE resin content of 45% to 80% and with no organic solvent is selected for the FEVE type fluorocarbon powder coating. The remaining components of the FEVE type fluorocarbon powder coating except the FEVE resin are other common powder type resins in the coating field.

The second objective of the disclosure is implemented through the following technical solutions.

A preparation method of composite coating for eliminating pollution by heavy metal chromium and VOCs from a source, and the method includes the following steps.

(1) A conversion film layer is formed on a metal surface by using a surface pretreatment liquid.

(2) The conversion film layer is treated as a transition layer, and a surface thereof is coated with a FEVE type fluorocarbon powder coating to form a coating surface layer.

(3) The coating surface layer is cured to form a composite coating.

The metal may include a single metal and an alloy.

Preferably, before the surface pretreatment liquid is used in step (1), the metal surface is etched, and the etching amount is preferably not less than 1.2 g/m².

Immersion, spraying, or coating may be used in step (1) to cover the surface pretreatment liquid on the metal surface to form the conversion film layer. Preferably, the pH value of the surface pretreatment liquid is adjusted to 2.6 to 4.2, the treatment time is 2 minutes to 12 minutes when the method of immersion is adopted, the treatment time is 20 seconds to 60 seconds and the spraying pressure is less than 0.05 MPa when the method of spraying is adopted, and the treatment time is 10 seconds to 20 seconds when the method of coating is adopted. More preferably, the pH value of the surface pretreatment liquid is adjusted to 2.6 to 4.0, the treatment time is 2 minutes to 10 minutes when the method of immersion is adopted, the treatment time is 25 seconds to 50 seconds and the spraying pressure is less than 0.05 MPa when the method of spraying is adopted, and the treatment time is 15 seconds to 20 seconds when the method of coating is adopted.

Preferably, after immersion, spraying, or coating is performed, the conversion film layer is dried to speed up the forming of the conversion film layer, the drying temperature is 80° C. to 120° C., more preferably 85° C. to 100° C., and the drying time is 10 minutes to 20 minutes.

Preferably, the FEVE type fluorocarbon powder coating is sprayed on the surface of the conversion film layer by means of electrostatic spraying in step (2), the thickness of spraying is preferably 45 μm to 100 μm when the FEVE resin content of the FEVE type fluorocarbon powder coating is 40% to 100%, and the thickness of spraying is preferably 45 μm to 90 μm when the FEVE resin content of the FEVE type fluorocarbon powder coating is 45% to 80%.

Preferably, in the process of electrostatic spraying, the electrostatic high voltage is 65 kV to 80 kV, the electrostatic current is 10 μA to 15 μA, and the atomization pressure is 0.4 MPa to 0.45 MPa.

During the curing process in step (3), the curing temperature is 200° C. to 240° C., and the curing time is 10 minutes to 30 minutes.

Compared to the related art, the beneficial effects of the disclosure include the following.

1. In the disclosure, an organic substance with a specific structure and titanium/or zirconium salt are preferably selected as the main components of the metal surface pretreatment film. On the basis of stoichiometric calculations, $MnF_2$ is screened out as a "bridging" agent for metal titanium/or zirconium ions to connect with organic compounds. After treatment, a metal-organic film is formed, and this film is treated as the bottom layer to be coated with the FEVE type fluorocarbon powder coating to form a composite coating. In this way, the emission of heavy metal chromium and VOC pollutants is eliminated from the source of the treatment process, and the current model of "generation first, treatment later" is changed for heavy metal chromium and VOC pollutants. In addition, in terms of performance, the composite coating can meet the requirements of relevant technical standards, and the good compatibility between the "chromium-free" pretreatment technology and the powder type fluorocarbon coating is thus realized.

2. In addition to aluminum and aluminum alloys, the disclosure is also applicable to many common metals and their alloys, and has a wide range of applications.

3. The composite coating provided by the disclosure has good performance, and after the impact resistance, cupping resistance, and bending resistance tests, the coating has no obvious cracks. Both the boiling water adhesion and high-pressure boiling water adhesion test results are grade 0. After 2,000 hours of acetic acid salt spray (AASS) testing, the penetration area along the grid is ≤8 $mm^2$/10 cm, and the maximum penetration length along the grid is ≤2 mm. After 1,000 hours of filiform corrosion (FFC) testing, the maximum length of corrosion is ≤2 mm, the average length of corrosion is ≤2 mm, and the number of filiform corrosion is ≤15/10 cm.

4. After Florida exposure is performed to test the performance of the composite coating provided by the disclosure for 24 months, the coating gloss retention rate is greater than 98%, and after 4,000 hours of QV-B accelerated aging testing, the coating gloss retention rate is above 85%.

5. The preparation method of the disclosure has a simple process, and the conversion film layer may be prepared by immersion, spraying, and coating, and may be adapted to different technological production conditions. Further, the selection range of process parameters is wide, and the operation requirements are not high, so the method is convenient to implement.

BRIEF DESCRIPTION OF THE DRAWINGS

The disclosure is further described in detail through the accompanying figures.

DESCRIPTION OF THE EMBODIMENTS

Figure 1:
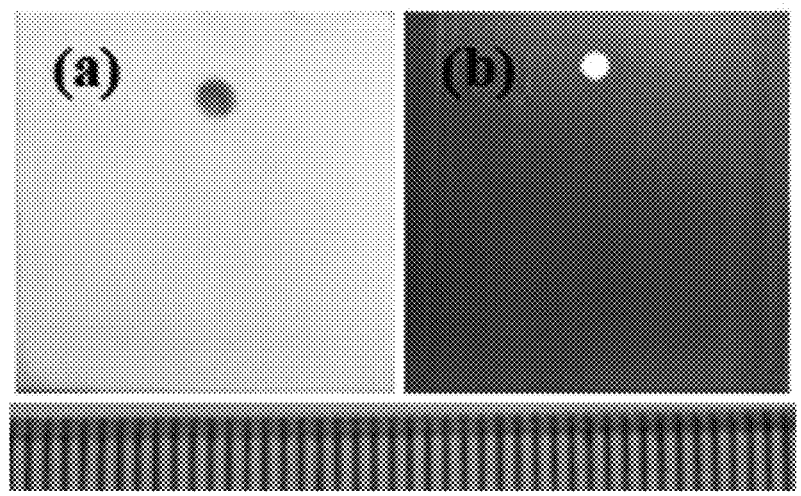
FIG. 1 is a picture showing effects of a metal surface treated with a conversion film layer.

The disclosure is further described in detail through the following specific embodiments.

Embodiment 1

A composite coating is prepared by the following method:

(1) A metal surface to be treated is etched, and the etching amount is 1.2 $g/m^2$.

(2) A surface pretreatment liquid is evenly sprayed on the metal surface to be treated, the spray pressure is 0.03 MPa, and the treatment time is 20 seconds to form a conversion film layer. The surface pretreatment liquid includes the following components in percentage by weight: 0.3 mmol/L of 2,4,6-trihydroxybenzoic acid, 0.5 mmol/L of sodium fluorozirconate, 0.1 mmol/L of diluted sulfuric acid solution of manganese fluoride dihydrate, 0.1 mmol/L of potassium fluoride, and $6 \times 10^{-6}$ mmol/L of sodium diisooctyl maleate sulfonate, and pH is adjusted to 4.2.

(3) The conversion film layer is dried for 20 minutes, and the temperature is controlled at 80° C.

(4) The conversion film layer is treated as a transition layer, and a fluorocarbon powder coating with 100% FEVE resin content is sprayed on a surface thereof by electrostatic spraying to form a coating surface layer. The spraying thickness is 45 μm, the high voltage of electrostatic spraying is 70 kV, the electrostatic current is 15 μA, and the atomization pressure is 0.4 Mpa.

(5) Under the condition of 200° C., the coating surface layer is cured for 30 minutes to form a composite coating.

Embodiment 2

A composite coating is prepared by the following method:
(1) A metal surface to be treated is etched, and the etching amount is 1.5 g/m$^2$.
(2) A metal to be treated is placed in a surface pretreatment liquid and immersed for 12 minutes to form a conversion film layer. The surface pretreatment liquid includes the following components in percentage by weight: 1.0 mmol/L of 3,4,5-trihydroxybenzoic acid, 0.3 mmol/L of fluorotitanic acid, 0.5 mmol/L of diluted sulfuric acid solution of manganese fluoride dihydrate, 0.2 mmol/L of potassium sulfate, and $2\times10^{-6}$ mmol/L of ammonium diisooctyl maleate sulfonate, and pH is adjusted to 2.6.
(3) The conversion film layer is dried for 10 minutes, and the temperature is controlled at 100° C.
(4) The conversion film layer is treated as a transition layer, and a fluorocarbon powder coating with 80% FEVE resin content is sprayed on a surface thereof by electrostatic spraying to form a coating surface layer. The spraying thickness is 90 μm, the high voltage of electrostatic spraying is 65 kV, the electrostatic current is 10 μA, and the atomization pressure is 0.45 Mpa.
(5) Under the condition of 240° C., the coating surface layer is cured for 10 minutes to form a composite coating.

Embodiment 3

A composite coating is prepared by the following method:
(1) A metal surface to be treated is etched, and the etching amount is 1.3 g/m$^2$.
(2) A surface pretreatment liquid is evenly coated on the metal surface to be treated, and the treatment time is 20 seconds to form a conversion film layer. The surface pretreatment liquid includes the following components in percentage by weight: 0.2 mmol/L of 3,4,5-trihydroxybenzaldehyde, 0.1 mmol/L of ammonium fluozirconate, 0.3 mmol/L of diluted sulfuric acid solution of manganese fluoride dihydrate, 0.5 mmol/L of potassium hexafluorochlorate, and $4\times10^{-6}$ mmol/L of sodium diisooctyl maleate sulfonate, and is pH adjusted to 3.0.
(3) The conversion film layer is dried for 15 minutes, and the temperature is controlled at 120° C.
(4) The conversion film layer is treated as a transition layer, and a fluorocarbon powder coating with 40% FEVE resin content is sprayed on a surface thereof by electrostatic spraying to form a coating surface layer. The spraying thickness is 100 μm, the high voltage of electrostatic spraying is 80 kV, the electrostatic current is 12 μA, and the atomization pressure is 0.42 Mpa.
(5) Under the condition of 220° C., the coating surface layer is cured for 20 minutes to form a composite coating.

Embodiment 4

A composite coating is prepared by the following method:
(1) A metal surface to be treated is etched, and the etching amount is 1.25 g/m$^2$.
(2) A surface pretreatment liquid is evenly coated on the metal surface to be treated, and the treatment time is 10 seconds to form a conversion film layer. The surface pretreatment liquid includes the following components in percentage by weight: 0.5 mmol/L of 3,4,5-trihydroxybenzamide, 0.2 mmol/L of Sodium fluorotitanate, 0.25 mmol/L of diluted sulfuric acid solution of manganese fluoride dihydrate, 0.5 mmol/L of sodium sulfate, and $5\times10^{-6}$ mmol/L of sodium diisooctyl maleate sulfonate, and pH is adjusted to 3.5.
(3) The conversion film layer is dried for 12 minutes, and the temperature is controlled at 85° C.
(4) The conversion film layer is treated as a transition layer, and a fluorocarbon powder coating with 45% FEVE resin content is sprayed on a surface thereof by electrostatic spraying to form a coating surface layer. The spraying thickness is 60 μm, the high voltage of electrostatic spraying is 70 kV, the electrostatic current is 10 μA, and the atomization pressure is 0.4 Mpa.
(5) Under the condition of 230° C., the coating surface layer is cured for 15 minutes to form a composite coating.

Embodiment 5

A composite coating is prepared by the following method:
(1) A metal surface to be treated is etched, and the etching amount is 1.6 g/m$^2$.
(2) A surface pretreatment liquid is evenly sprayed on the metal surface to be treated, the spray pressure is 0.04 MPa, and the treatment time is 60 seconds to form a conversion film layer. The surface pretreatment liquid includes the following components in percentage by weight: 0.3 mmol/L of 2,4-dihydroxybenzoic acid, 0.4 mmol/L of fluozirconic acid, 0.4 mmol/L of diluted sulfuric acid solution of manganese fluoride dihydrate, 0.1 mmol/L of sodium hexafluoroaluminate, and $3\times10^{-6}$ mmol/L of sodium diisooctyl maleate sulfonate, and pH is adjusted to 4.0.
(3) The conversion film layer is dried for 20 minutes, and the temperature is controlled at 80° C.
(4) The conversion film layer is treated as a transition layer, and a fluorocarbon powder coating with 70% FEVE resin content is sprayed on a surface thereof by electrostatic spraying to form a coating surface layer. The spraying thickness is 70 μm, the high voltage of electrostatic spraying is 75 kV, the electrostatic current is 15 μA, and the atomization pressure is 0.45 Mpa.
(5) Under the condition of 200° C., the coating surface layer is cured for 20 minutes to form a composite coating.

Embodiment 6

A composite coating is prepared by the following method:
(1) A metal surface to be treated is etched, and the etching amount is 1.7 g/m$^2$.
(2) A metal to be treated is placed in a surface pretreatment liquid and immersed for 2 minutes to form a conversion film layer. The surface pretreatment liquid includes the following components in percentage by weight: 0.6 mmol/L of 3,4,5-trihydroxybenzoic acid, 0.2 mmol/L of potassium fluorotitanate, 0.25 mmol/L of diluted sulfuric acid solution of manganese fluoride dihydrate, 0.3 mmol/L of potassium sulfate, and $2.5\times10^{-6}$ mmol/L of ammonium diisooctyl maleate sulfonate, and pH is adjusted to 3.2.
(3) The conversion film layer is dried for 15 minutes, and the temperature is controlled at 100° C.
(4) The conversion film layer is treated as a transition layer, and a fluorocarbon powder coating with 60% FEVE resin content is sprayed on a surface thereof by electrostatic spraying to form a coating surface layer. The spraying thickness is 60 μm, the high voltage of electrostatic spraying is 75 kV, the electrostatic current is 13 μA, and the atomization pressure is 0.45 Mpa.

(5) Under the condition of 240° C., the coating surface layer is cured for 25 minutes to form a composite coating.

Embodiment 7

Test of Morphology of Conversion Film Layer

A metal to be treated is placed and immersed in a surface pretreatment liquid to form a conversion film layer. As shown in FIG. 1, the formed conversion film layer is uniform and flat.

Figure 2:
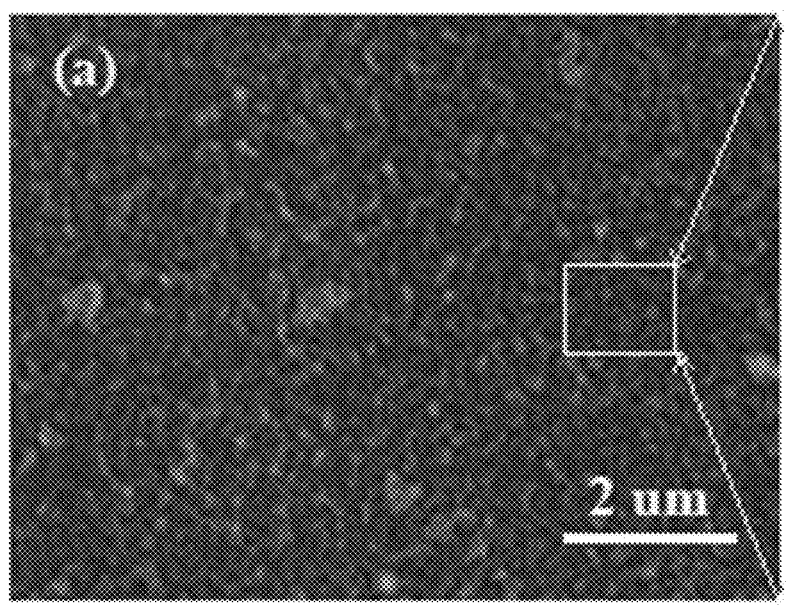
FIG. 2 is a SEM image of the conversion film layer.
Figure 3:
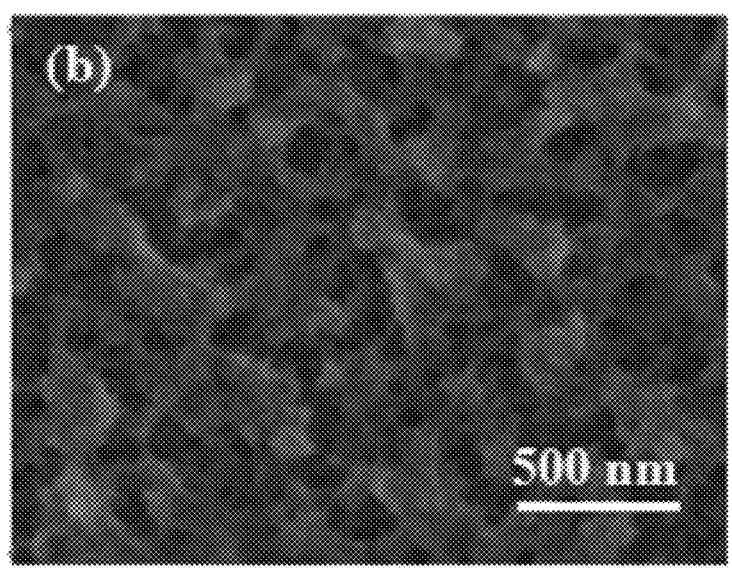
FIG. 3 is a partial enlarged view of FIG. 2.

As shown in FIG. 2 and FIG. 3, it can be seen from the SEM images that the conversion film layer exhibits a honeycomb skeleton structure. This honeycomb skeleton structure provides a good attachment point for the fluorocarbon powder coating, and has a positive impact on the compatibility of the conversion film layer with the fluorocarbon powder coating.

Embodiment 8

Test of Corrosion Resistance of Conversion Film Layer

The corrosion resistance of the conversion film layer is evaluated by using the polarization curve graph and the alternating current impedance analysis of the conversion film layer.

Figure 4:
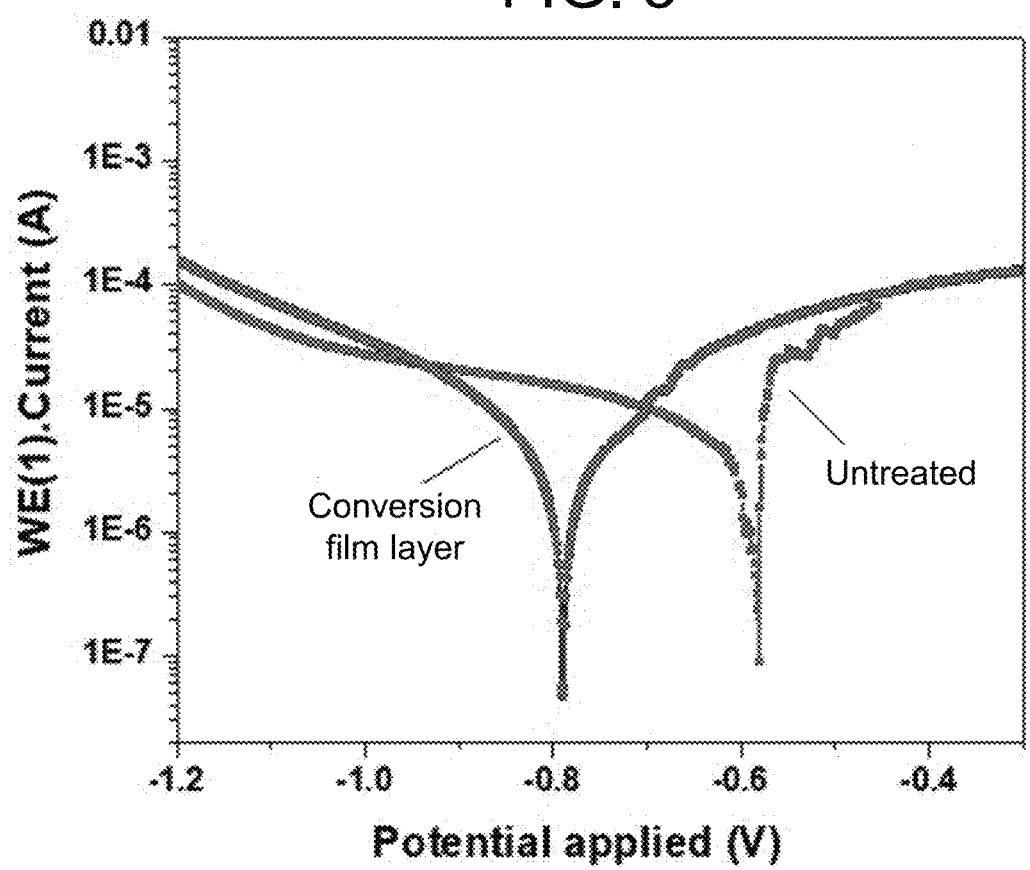
FIG. 4 is a comparison graph of polarization curves of metal surfaces treated with the conversion film layer and not treated with the conversion film layer.

As shown in the comparison graph of the polarization curves of aluminum surfaces treated with the conversion film layer and not treated with the conversion film layer treatment in FIG. 4, the corrosion current density of the samples is significantly reduced after conversion treatment, indicating that the conversion film layer itself has good corrosion resistance.

Figure 5:
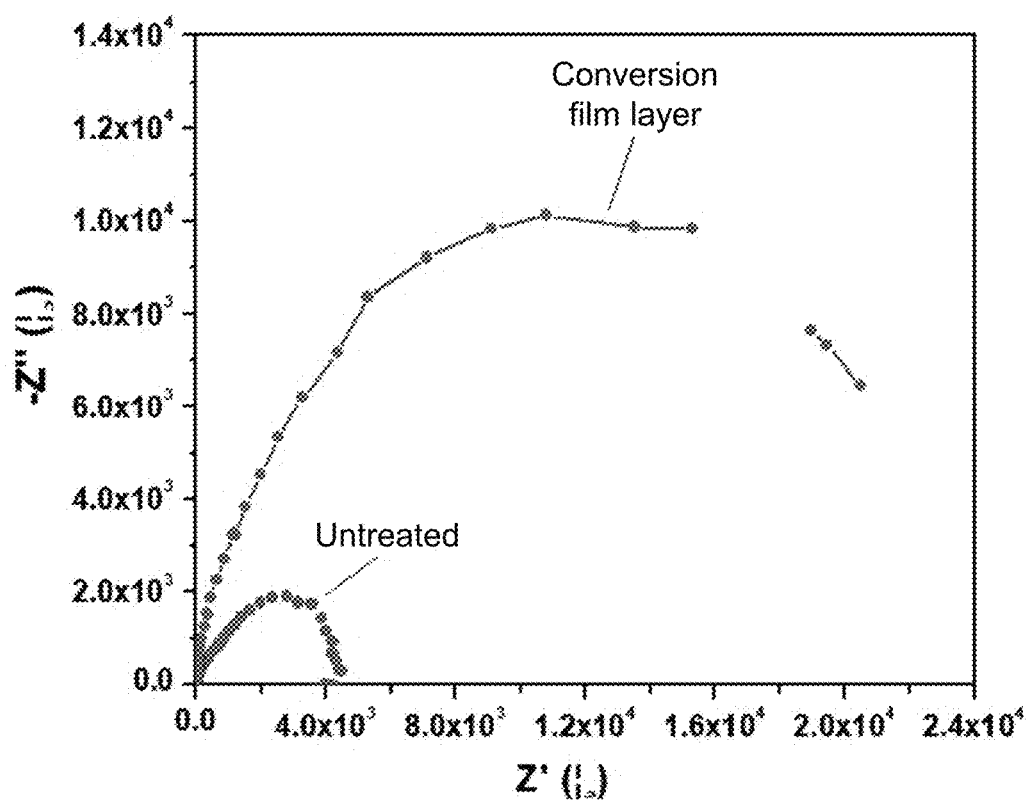
FIG. 5 is a comparison graph of alternating current impedances of metal surfaces treated with the conversion film layer and not treated with the conversion film layer.

As shown in the comparison graph of the alternating current impedances treated with the conversion film layer and not treated with the conversion film layer treatment in FIG. 5, the impedance of the sample treated with the conversion film layer is significantly greater than that of the untreated sample, indicating that the corrosion resistance of the aluminum substrate is considerably improved through the conversion film layer prepared by the disclosure.

Therefore, it can be seen from the test results in FIG. 4 and FIG. 5 that the corrosion resistance of the metal treated with the conversion film layer is significantly improved compared with that before the treatment.

Embodiment 9

Test of Adhesion Rate of Composite Coating Fluorocarbon Resin

Figure 6:
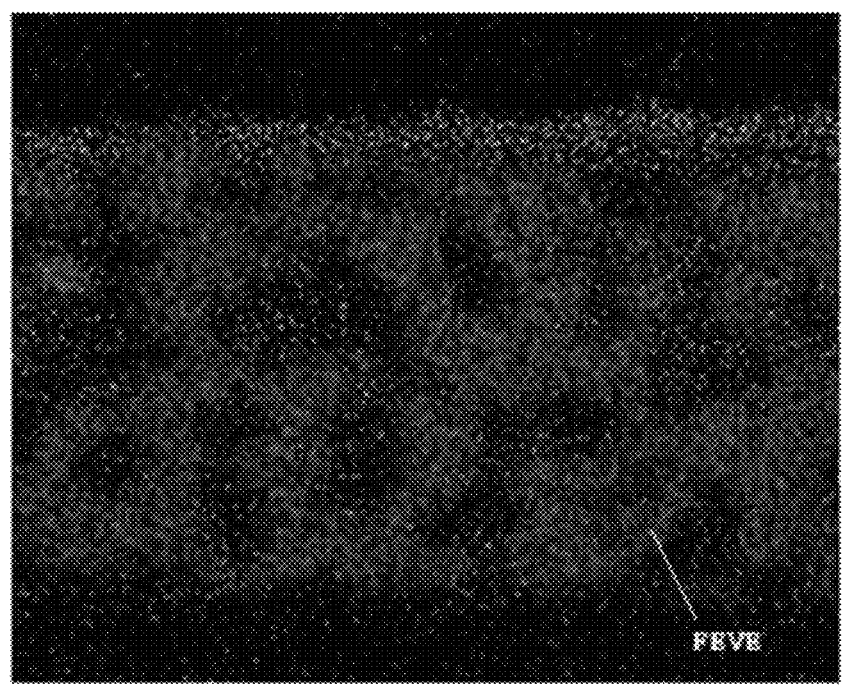
FIG. 6 is EDX mapping of FEVE type fluorocarbon resin of a composite coating.

The composite coating is tested by EDX mapping, and the results are shown in FIG. 6. It can be seen from the figure that the surface coverage of the fluorocarbon resin is relatively high, indicating that the fluorocarbon resin has good adhesion on the conversion film layer.

Embodiment 10

Results of Mechanical Property Testing of Composite Coating

The methods of impact resistance test, cupping resistance test, and bending resistance test of the composite coating are all carried out in accordance with the standard methods of GB/T 5237.4-2017.

Figure 7:
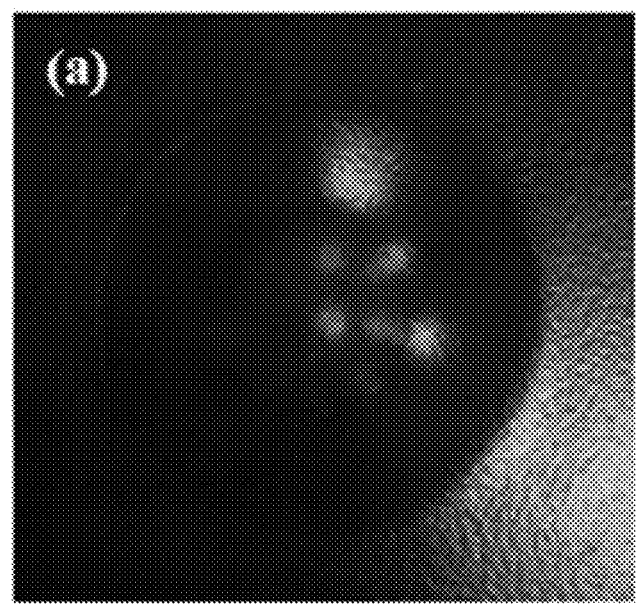
FIG. 7 is an image of a test of impact resistance of the composite coating.
Figure 8:
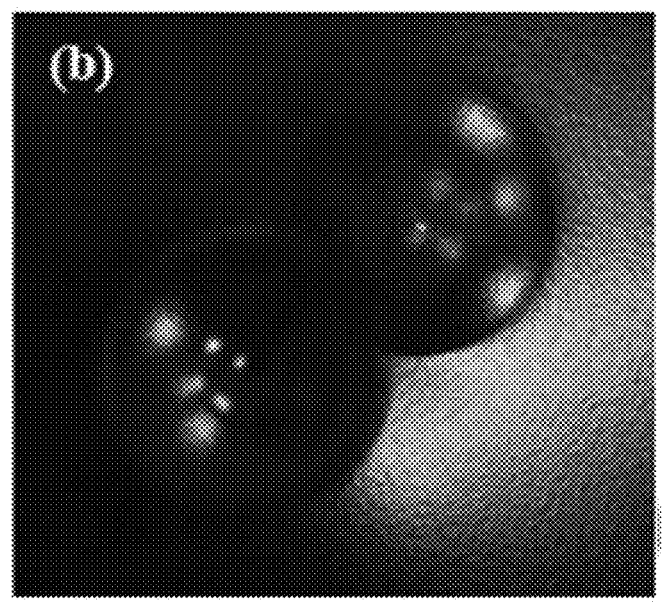
FIG. 8 is an image of a test of cupping performance of the composite coating.
Figure 9:
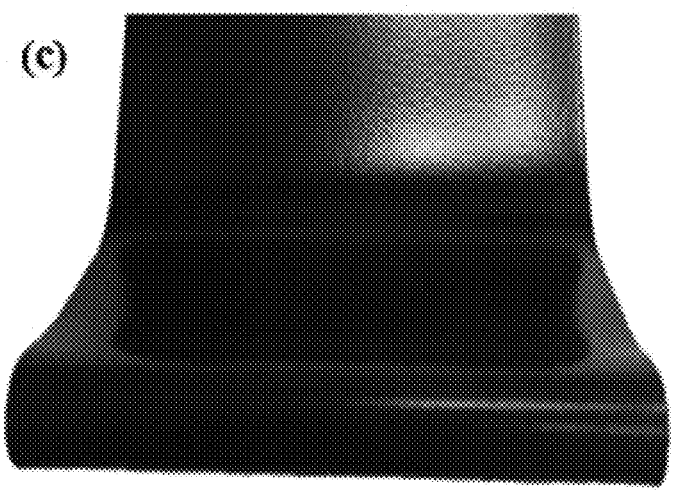
FIG. 9 is an image of a test of flexural properties of the composite coating.

As shown in FIG. 7 to FIG. 9, after the metal treated by the composite coating is tested for impact resistance, cupping resistance, and bending resistance, the composite coating has no obvious cracks and can meet the requirements of the I-level film performance.

Embodiment 11

The adhesion performance test of the composite coating against boiling water and high pressure boiling water is carried out according to the standard method of GB/T 5237.4-2017.

Figure 10:
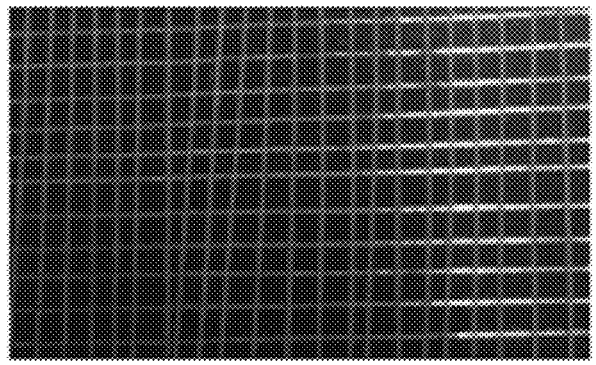
FIG. 10 is an image of a test of boiling water adhesion performance of the composite coating.
Figure 11:
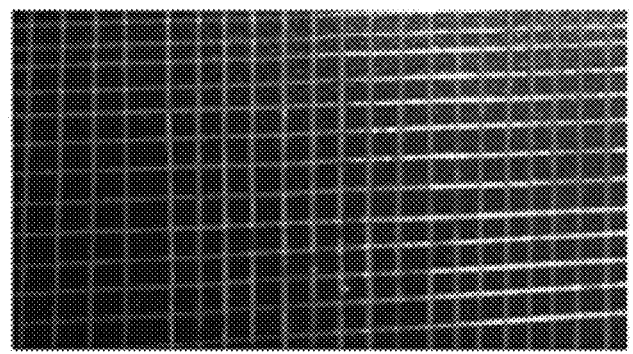
FIG. 11 is an image of a test of high pressure boiling water adhesion performance of the composite coating.

As shown in FIG. 10 and FIG. 11, after the test, the composite coating has no color change or peeling off, and the test results are all grade 0.

Embodiment 12

Acetic Acid Salt Spray Testing and Filiform Corrosion Testing of Composite Coating The methods of the acetic acid salt spray testing and the filiform corrosion testing are carried out according to the standard method of GB/T 5237.4-2017.

Figure 12:
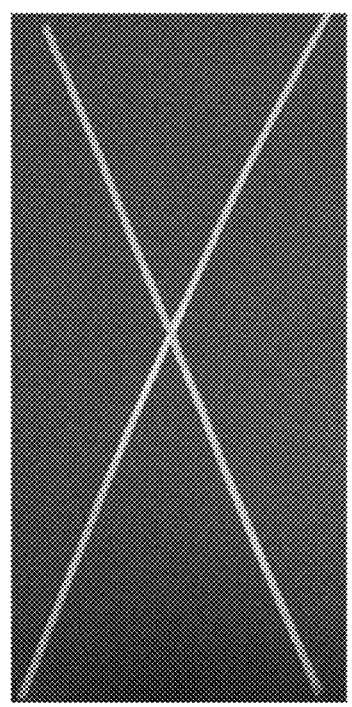
FIG. 12 is an image of 2,000 hours of acetic acid salt spray testing of the composite coating.

As shown in FIG. 12, after 2,000 hours of acetic acid salt spray (AASS) testing, the penetration area along the grid is ≤8 mm²/10 cm, and the maximum penetration length along the grid is ≤2 mm.

After 1,000 hours of filiform corrosion (FFC) testing, the maximum length of corrosion is ≤2 mm, the average length of corrosion is ≤2 mm, and the number of filiform corrosion is ≤15/10 cm.

Embodiment 13

Aging Resistance Testing of Composite Coating

Figure 13:
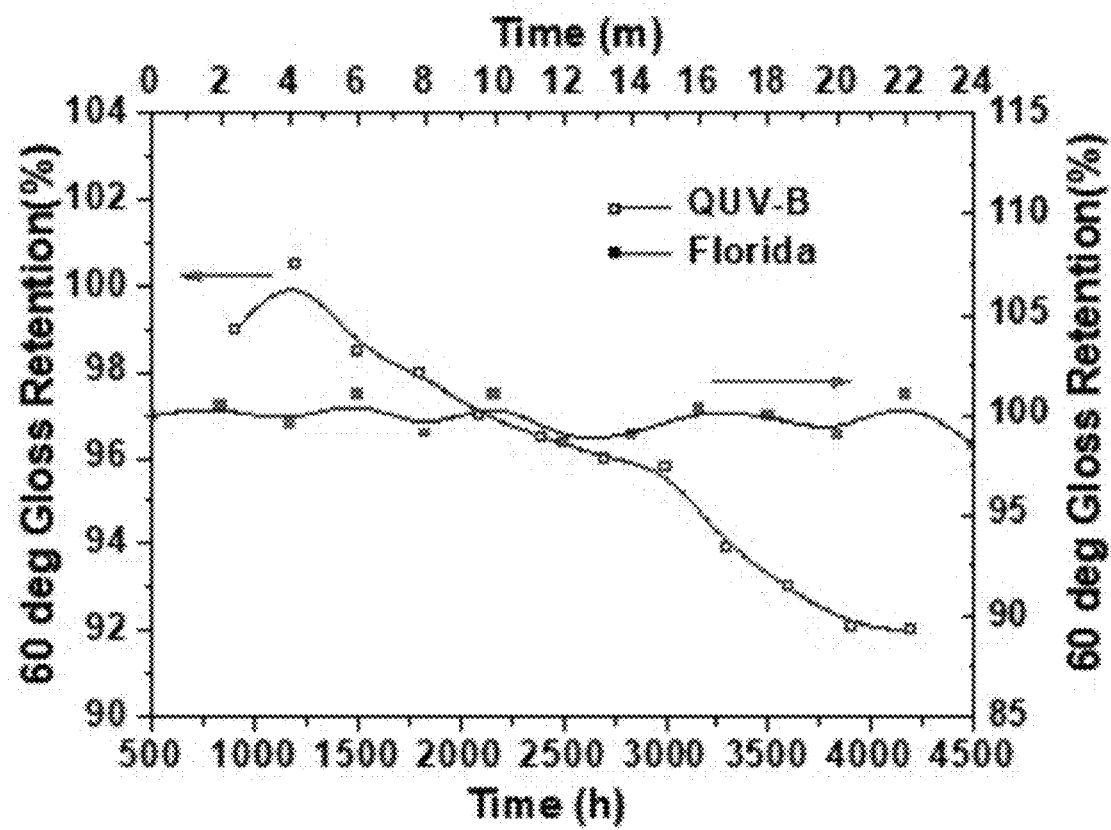
FIG. 13 is a data plot of results of a Florida exposure test for 24 months of the composite coating.

As shown in FIG. 13, after Florida exposure is performed on the composite coating for 24 months, the coating gloss retention rate is greater than 98%, and after 4,000 hours of QV-B accelerated aging testing, the coating gloss retention rate is greater than 85%.

After comparative experiments, it is shown that when the abovementioned embodiments 1 to 6 are applied to various common metal materials, equivalent technical effects can be achieved. In the embodiments, the organic compound A having at least two phenolic hydroxyl groups is not limited to the mentioned 3,4,5-trihydroxybenzamide, 3,4,5-trihydroxybenzoic acid, 3,4,5-trihydroxybenzaldehyde, and 2,4,6-trihydroxybenzoic acid, and may also be other organic compounds having the following structure:

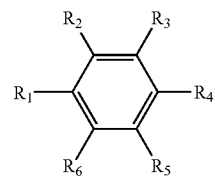

where $R_2$, $R_3$, $R_4$, $R_5$, and $R_6$ are selected from H (hydrogen) or OH (hydroxyl), and at least two of $R_2$, $R_3$, $R_4$, $R_5$, and $R_6$ are OH. For instance, $R_2$ and $R_3$ are hydroxyl groups, $R_3$ and $R_4$ are hydroxyl groups, and $R_2$ and $R_4$ are hydroxyl groups, $R_2$ and $R_5$ are hydroxyl groups, $R_2$ and $R_6$ are hydroxyl groups, $R_3$ and $R_5$ are hydroxyl groups, $R_3$ and $R_6$ are hydroxyl groups, $R_2$, $R_3$, and $R_4$ are hydroxyl groups, $R_2$, $R_3$, and $R_5$ are hydroxyl groups, $R_2$, $R_3$, and $R_6$ are hydroxyl groups, $R_3$, $R_4$, and $R_5$ are hydroxyl groups, $R_2$, $R_4$, and $R_5$ are hydroxyl groups, etc.; $R_1$ can be selected from other substituents such as an amide group, a carboxyl group, and an aldehyde group.

In addition to the benzene ring, other condensed ring compounds may also be used without affecting the implementation of the objective of the disclosure, and similar technical effects may also be produced.

Similarly, the ionic compound B is selected from fluozirconic acid and fluozirconate or is selected from fluotitanic acid and fluotitanate and includes but not limited to one or more of potassium fluorozirconate, sodium fluorozirconate, ammonium fluorozirconate, potassium fluorotitanate, sodium fluorotitanate, and ammonium fluorotitanate. The cation in the ionic compound B does not affect the implementation of the objective of the disclosure.

The mixed solution C is prepared by dissolving manganese fluoride dihydrate in dilute sulfuric acid. The inorganic salt D may be various inorganic salts containing potassium ions or sodium ions. The type of the anion has no obvious effect on the formation and performance of the conversion film layer as well as the performance of the final composite coating. The inorganic salt D may be one or more of sodium sulfate, potassium sulfate, sodium fluoride, potassium fluoride, sodium hexafluoroaluminate, potassium hexafluorochlorate, etc.

The fast penetrating agent diisooctyl maleate sulfonate is an optional component, which accelerates the film-forming speed of the conversion film layer. Even if the fast penetrating agent is not included in the surface pretreatment liquid, it may not hinder the implementation of the objective of the disclosure.

The content of FEVE resin is selected to be 40% to 100%, and more preferably 45% to 80% for the FEVE type fluorocarbon powder coating, and the remaining components are other powder-type resins. FEVE type fluorocarbon powder coatings within the above content range may achieve similar technical effects.

It should be noted that the above embodiments are only further descriptions of the disclosure, rather than limitations. Any adjustments or changes made by a person having ordinary skill in the art within the meaning and scope equivalent to the technical solutions of the disclosure should be considered to be included in the protection scope of the disclosure.

What is claimed is:

1. A composite coating for eliminating pollution by chromium and VOCs from a source, comprising a conversion film layer and a coating surface layer, wherein:
    the conversion film layer is made from a surface pretreatment liquid, and the surface pretreatment liquid comprises the following components:
        an organic compound A having an aromatic ring and at least two phenolic hydroxyl groups in the molecule thereof or a hydrate of the organic compound A;
        an ionic compound B containing an element of zirconium and/or titanium and fluorine;
        a mixed solution C containing manganese fluoride; and
        an inorganic salt D containing potassium ions or sodium ions,
    wherein the coating surface layer is a FEVE-type fluorocarbon powder coating layer,
    wherein a molecular structure of the at least two phenolic hydroxyl groups in the molecule of the organic compound A is:

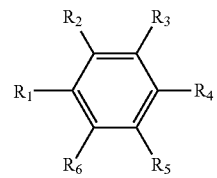

wherein $R_2$, $R_3$, $R_4$, $R_5$, and $R_6$ are selected from H or OH, and at least two of $R_2$, $R_3$, $R_4$, $R_5$, and $R_6$ are OH, and
$R_1$ is selected from an amide group, a carboxyl group, or an aldehyde group.

2. The composite coating for eliminating pollution by chromium and VOCs from a source according to claim 1, wherein the surface pretreatment liquid further comprises a penetrating agent E.

3. The composite coating for eliminating pollution by chromium and VOCs from a source according to claim 2, wherein the molar concentration of each component of the surface pretreatment liquid is:
    0.2 mmol/L to 1.0 mmol/L of the organic compound A having an aromatic ring and at least two phenolic hydroxyl groups in the molecule thereof or the hydrate of the organic compound A;
    0.1 mmol/L to 0.5 mmol/L of the ionic compound B containing an element of zirconium and/or titanium and fluorine;
    0.1 mmol/L to 0.5 mmol/L of the mixed solution C containing manganese fluoride; and
    0.1 mmol/L to 0.5 mmol/L of the inorganic salt D containing potassium ions or sodium ions; and
    $2 \times 10^{-6}$ mmol/L to $6 \times 10^{-6}$ mmol/L of the penetrating agent E,
    wherein the concentration of the mixed solution C is calculated based on the concentration of manganese ions therein.

4. The composite coating for eliminating pollution by chromium and VOCs from a source according to claim 3, wherein the ionic compound B is selected from fluozirconic acid and/or fluozirconate or from fluotitanic acid and/or fluotitanate.

5. The composite coating for eliminating pollution by chromium and VOCs from a source according to claim 4, wherein the ionic compound B is selected from one or more of potassium fluorozirconate, sodium fluorozirconate, and ammonium fluorozirconate or from one or more of potassium fluorotitanate, sodium fluorotitanate, and ammonium fluorotitanate.

6. The composite coating for eliminating pollution by chromium and VOCs from a source according to claim 3, wherein the mixed solution C is prepared by dissolving manganese fluoride dihydrate in dilute sulfuric acid.

7. The composite coating for eliminating pollution by chromium and VOCs from a source according to claim 3, wherein the inorganic salt D is one or more of sodium sulfate, potassium sulfate, sodium fluoride, potassium fluoride, sodium hexafluoroaluminate, and potassium hexafluorochlorate.

8. The composite coating for eliminating pollution by chromium and VOCs from a source according to claim 3, wherein the penetrating agent E is diisooctyl maleate sulfonate.

9. The composite coating for eliminating pollution by chromium and VOCs from a source according to claim 3, wherein the FEVE-type fluorocarbon powder coating layer is selected from a fluorocarbon type powder coating with a FEVE resin content of 40% to 100% and with no organic solvent.

10. The composite coating for eliminating pollution by chromium and VOCs from a source according to claim 9, wherein the FEVE-type fluorocarbon powder coating layer is selected from a fluorocarbon type powder coating with a FEVE resin content of 45% to 80% and with no organic solvent.

11. The composite coating for eliminating pollution by chromium and VOCs from a source according to claim 1, wherein the organic compound A is selected from one or more of 3,4,5-trihydroxybenzamide, 3,4,5-trihydroxybenzoic acid, 3,4,5-trihydroxybenzaldehyde, and 2,4,6-trihydroxybenzoic acid.

12. The composite coating for eliminating pollution by chromium and VOCs from a source according to claim 11, wherein the organic compound A is 3,4,5-trihydroxybenzoic acid.

13. A preparation method of the composite coating for eliminating pollution by chromium and VOCs from the source according to claim 1, comprising:
a step (1): forming a conversion film layer on a metal surface by using a surface pretreatment liquid;
a step (2): treating the conversion film layer as a transition layer and coating a surface thereof with a FEVE-type fluorocarbon powder coating to form a coating surface layer; and
a step (3): curing the coating surface layer to form a composite coating, wherein the surface pretreatment liquid comprises the following components:
an organic compound A having an aromatic ring and at least two phenolic hydroxyl groups in the molecule thereof or a hydrate of the organic compound A;
an ionic compound B containing an element of zirconium and/or titanium and fluorine;
a mixed solution C containing manganese fluoride; and
an inorganic salt D containing potassium ions or sodium ions,
wherein a molecular structure of the at least two phenolic hydroxyl groups in the molecule of the organic compound A is:

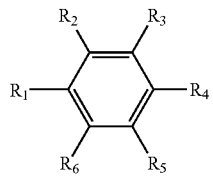

wherein $R_2$, $R_3$, $R_4$, $R_5$, and $R_6$ are selected from H or OH, and at least two of $R_2$, $R_3$, $R_4$, $R_5$, and $R_6$ are OH, and $R_1$ is selected from an amide group, a carboxyl group, or an aldehyde group.

14. The preparation method of the composite coating for eliminating pollution by chromium and VOCs from the source according to claim 13, further comprising:
before using the surface pretreatment liquid in the step (1), the metal surface is etched, and the etching amount is not less than 1.2 g/m².

15. The preparation method of the composite coating for eliminating pollution by chromium and VOCs from the source according to claim 14, wherein a manner of immersion, spraying, or coating is used in the step (1) to allow the surface pretreatment liquid covering the metal surface to form the conversion film layer.

16. The preparation method of the composite coating for eliminating pollution by chromium and VOCs from the source according to claim 15, wherein the pH value of the surface pretreatment liquid is adjusted to 2.6 to 4.2, and
the treatment time is 2 minutes to 12 minutes when the manner of immersion is used;
the treatment time is 20 seconds to 60 seconds and the spraying pressure is less than 0.05 MPa when the manner of spraying is used;
the treatment time is 10 seconds to 20 seconds when the manner of coating is used.

17. The preparation method of the composite coating for eliminating pollution by chromium and VOCs from the source according to claim 16, further comprising:
after the manner of immersion, spraying, or coating is performed, the conversion film layer is dried to speed up the forming of the conversion film layer, wherein the drying temperature is 80° C. to 120° C., and the drying time is 10 minutes to 20 minutes.

18. The preparation method of the composite coating for eliminating pollution by chromium and VOCs from the source according to claim 14, wherein the FEVE-type fluorocarbon powder coating is sprayed on the surface of the conversion film layer by means of electrostatic spraying in the step (2), the thickness of spraying is 45 μm to 100 μm when the FEVE resin content of the FEVE-type fluorocarbon powder coating is 40% to 100%; and the thickness of spraying is 45 μm to 90 μm when the FEVE resin content of the FEVE-type fluorocarbon powder coating is 45% to 80%,
wherein in the process of electrostatic spraying, the electrostatic high voltage is 65 kV to 80 kV, the electrostatic current is 10 μA to 15 μA, and the atomization pressure is 0.4 MPa to 0.45 MPa.

19. The preparation method of the composite coating for eliminating pollution by chromium and VOCs from the source according to claim 14, wherein during the curing process in the step (3), the curing temperature is 200° C. to 240° C., and the curing time is 10 minutes to 30 minutes.

* * * * *